United States Patent
Gilstring

(10) Patent No.: US 10,285,324 B2
(45) Date of Patent: May 14, 2019

(54) METHOD AND DEVICE FOR DISPENSING GRANULAR MATERIAL

(71) Applicant: Vaderstad Holding AB, Vaderstad (SE)

(72) Inventor: Gert Gilstring, Vadstena (SE)

(73) Assignee: Vaderstad Holding AB, Vaderstad (SE)

(*) Notice: Subject to any disclaimer, the term of this patent is extended or adjusted under 35 U.S.C. 154(b) by 0 days.

(21) Appl. No.: 15/524,518

(22) PCT Filed: Nov. 5, 2015

(86) PCT No.: PCT/SE2015/051172
§ 371 (c)(1),
(2) Date: May 4, 2017

(87) PCT Pub. No.: WO2016/072922
PCT Pub. Date: May 12, 2016

(65) Prior Publication Data
US 2017/0318737 A1    Nov. 9, 2017

(30) Foreign Application Priority Data
Nov. 7, 2014    (SE) ........................ 1451334

(51) Int. Cl.
*A01C 7/08*    (2006.01)
*A01C 7/04*    (2006.01)
(Continued)

(52) U.S. Cl.
CPC .............. *A01C 7/082* (2013.01); *A01C 7/081* (2013.01); *A01C 7/10* (2013.01); *A01C 7/102* (2013.01); *A01C 7/042* (2013.01); *A01C 7/06* (2013.01)

(58) Field of Classification Search
CPC ........... A01C 7/082; A01C 7/081; A01C 7/08; A01C 7/00; A01C 7/042; A01C 7/04;
(Continued)

(56) References Cited

U.S. PATENT DOCUMENTS 5,392,722 A    2/1995    Snipes et al.
6,253,693 B1    7/2001    Mayerle et al.
(Continued)

FOREIGN PATENT DOCUMENTS

WO    2013/180619 A1    12/2013

OTHER PUBLICATIONS

International Search Report and Written Opinion for International Application No. PCT/SE2015/051172 dated Mar. 11, 2016.
(Continued)

*Primary Examiner* — Christopher J. Novosad
(74) *Attorney, Agent, or Firm* — Olive Law Group, PLLC

(57) ABSTRACT

A method and a device for feeding granular material in an agricultural implement and an agricultural implement comprising such a device. The method includes establishing an air flow through a take-up zone in a direction toward an outlet of the take-up zone from an inlet of the take-up zone. The take-up zone, has an extend which, viewed in a horizontal plane, is defined by a roof above the take-up zone and side walls extending downward from the roof, so that a space, which is open in the downward direction and toward an outlet, is formed between the roof and the side walls. The method also includes feeding the material to the take-up zone with the aid of gravity, so that the material falls in a direction transversely to the airflow into the take-up zone, thus delimiting the space in the downward direction and adjusting an adjustable part which is adjustable between at least two positions, to regulate a flow rate of the airflow in the space between the material and the roof.

17 Claims, 7 Drawing Sheets

Figure 1:
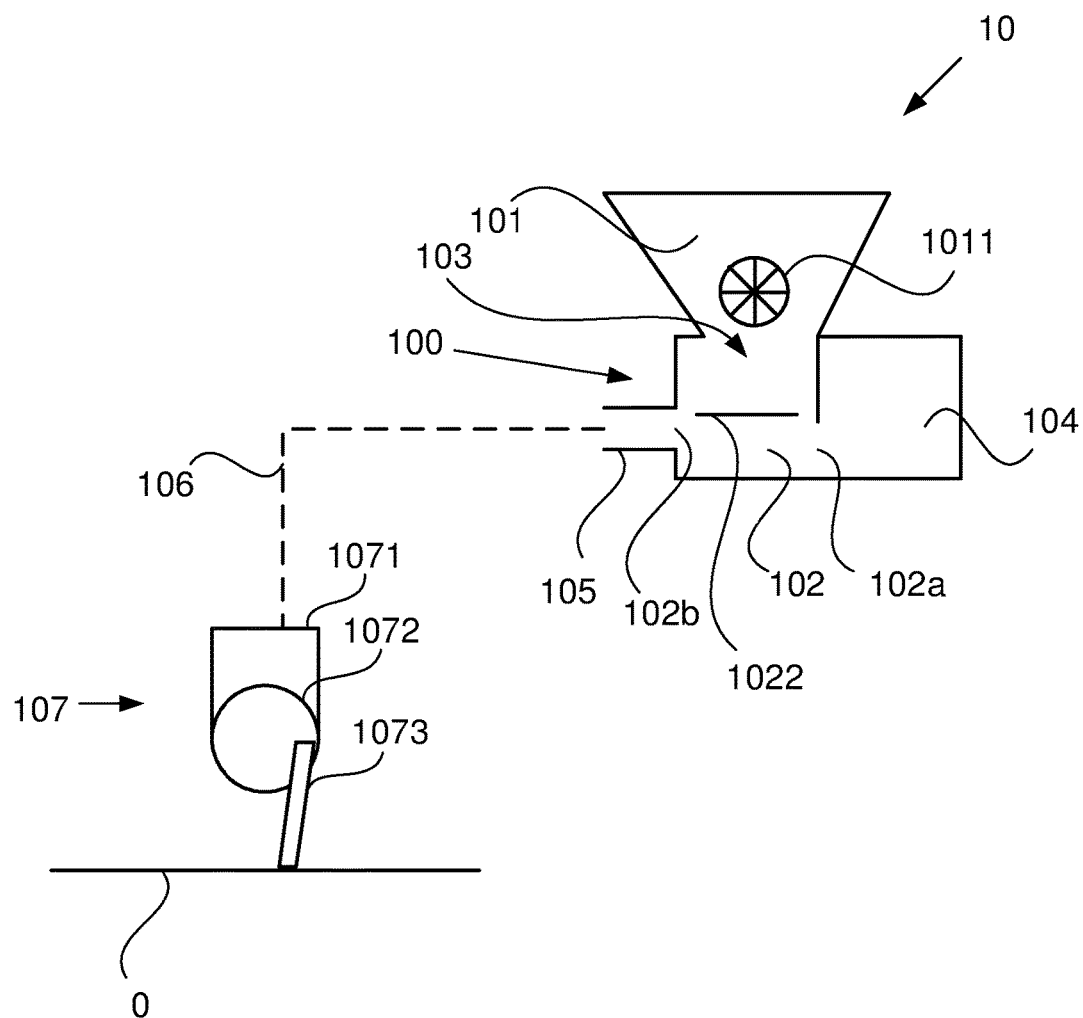
Figure 2:
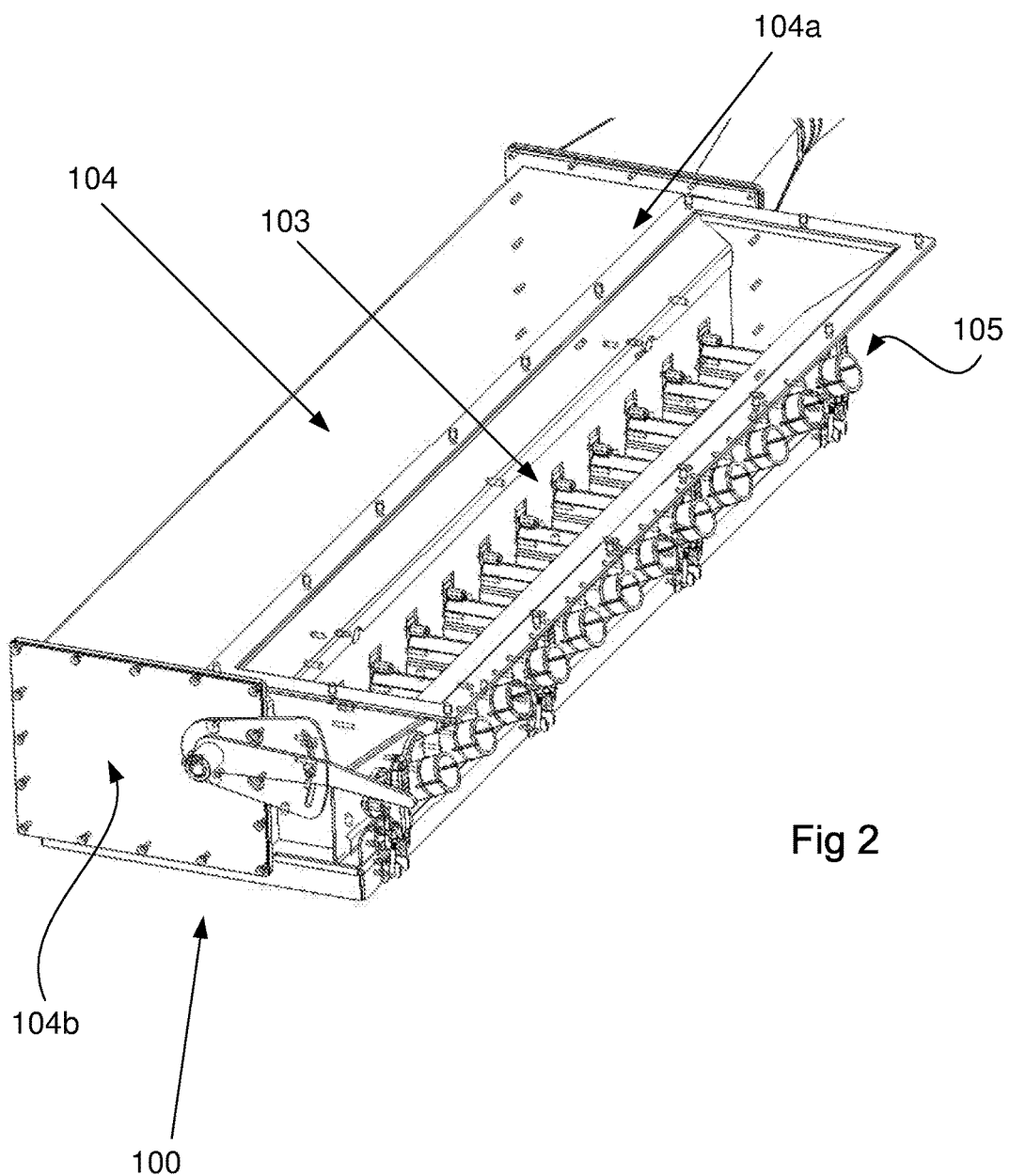
Figure 3:
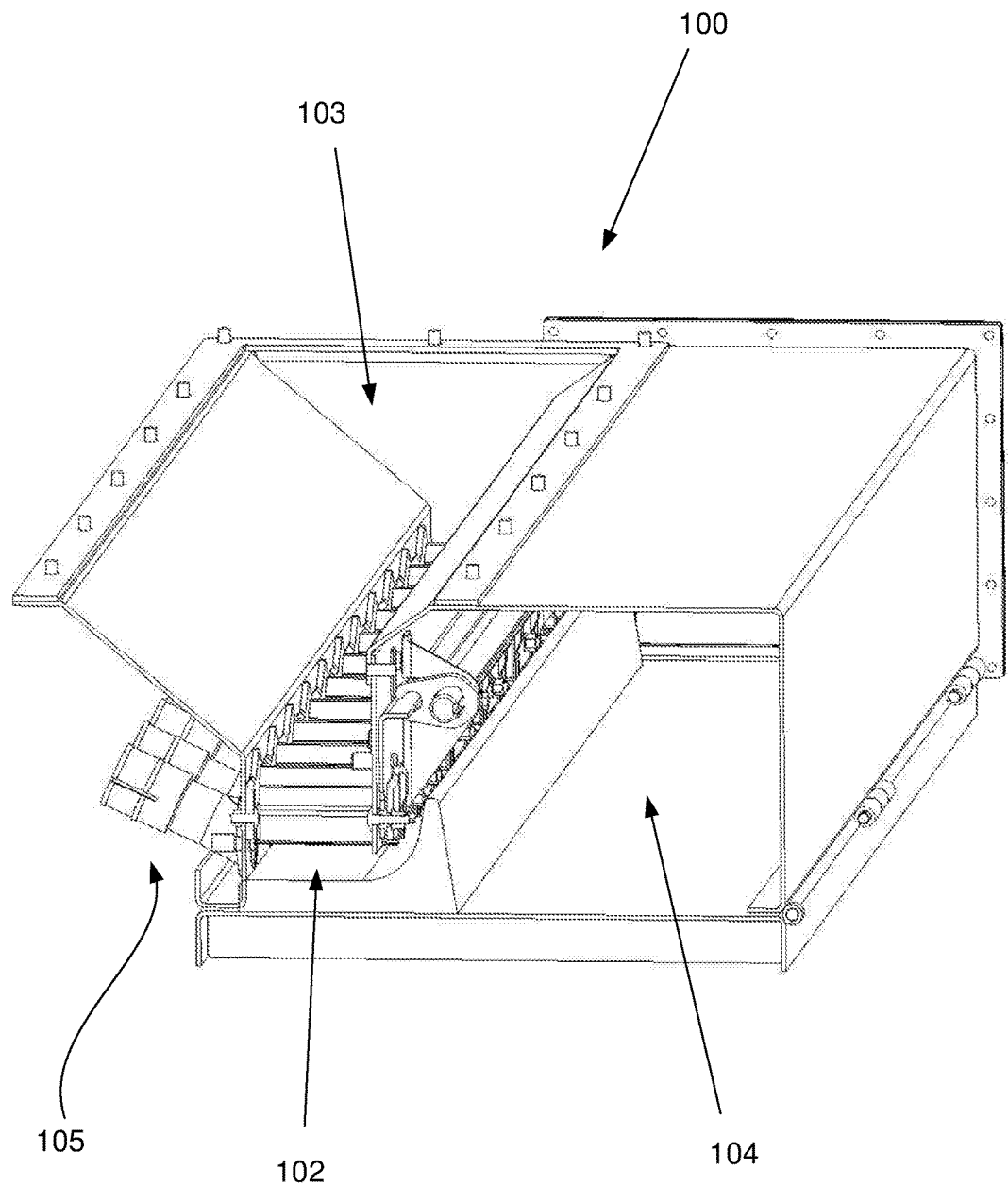

(51) Int. Cl.
*A01C 7/06* (2006.01)
*A01C 7/10* (2006.01)

(58) Field of Classification Search
CPC .. A01C 7/06; A01C 7/10; A01C 7/102; H05K 999/99; H05K 999/00
See application file for complete search history.

(56) References Cited

U.S. PATENT DOCUMENTS

| | | |
|---|---|---|
| 6,609,468 B1 | 8/2003 | Meyer et al. |
| 6,935,256 B1 | 8/2005 | Meyer |
| 2005/0172873 A1 | 8/2005 | Mayerle |
| 2005/0235890 A1 | 10/2005 | Mariman et al. |
| 2006/0042529 A1 | 3/2006 | Johnson et al. |

OTHER PUBLICATIONS

Central Commodity System. CCS Description and CCS System Theory of Operation (two (2) pages).

METHOD AND DEVICE FOR DISPENSING GRANULAR MATERIAL

CROSS REFERENCE TO RELATED APPLICATIONS

This application is a 35 USC 371 application of International PCT Patent Application No. PCT/SE2015/051172, filed on Nov. 5, 2015, which claims priority to Sweden Patent Application No. 1451334-5, filed on Nov. 7, 2014; the contents of which are hereby incorporated by reference herein in their entireties.

TECHNICAL FIELD

This document relates to a method and a device for feeding granular material with the aid of an airflow and to an agricultural implement comprising such a device. The method and the device are applicable where the material is fed from a main container to one or more dispensing units, which are provided with a respective buffer or other flow-equalizing device.

Specific applications comprise so-called "nursing systems" for distributing granular material in an agricultural implement, such as a seed drill, a precision seed drill, a fertilizer spreader or a pesticide spreader, and especially to nursing systems of the kind which have pneumatically assisted feeding of the granular material.

BACKGROUND

It is known to provide seed drills in which a central seed container is arranged to feed seed to a plurality of row units, which each comprise a metering device for controlling the dispensed quantity of seed for achieving a predetermined mutual distance between plants forming part of a respective row.

WO2013180619A1 shows a system in which granular material is fed from a central container to a plurality of row units, which each have a buffer and a metering device.

U.S. Pat. No. 6,609,468B1 shows a system in which material is fed from a central container to a plurality of row units with the aid of an airflow, and in which the flow of air and material is reduced or restricted once a sufficient level of material has been reached in the buffer of the row unit.

There is a need for an improved feed device for feeding granular material from a main container to a dispensing unit. In general terms, there is a need for a feed device of the kind which is operationally reliable and easy to use. More specifically, there is a need for a feed device which is easy to switch between feeding of different types of granular material.

SUMMARY

One object is therefore to provide an improved feeding method and an improved feed device. Specific objects comprise providing a feeding method and a feed device which meet the above requirements.

The invention is defined by the accompanying independent patent claims. Embodiments emerge from the dependent patent claims, from the following description and from the drawings.

According to a first aspect, a method for feeding granular material in an agricultural implement is provided. The method comprises providing a take-up zone, the extent of which, viewed in a horizontal plane, is defined by a roof above the take-up zone, providing side walls extending downward from the roof, so that a space (S), which is open in the downward direction and toward the outlet (102b), is formed between the roof and the side walls, providing an airflow through the take-up zone in the direction toward an outlet from the take-up zone, feeding the material to the take-up zone with the aid of gravity, so that the material falls in a direction transversely to the airflow into the take-up zone and thus delimits the space (S) in the downward direction, providing a part which is adjustable between at least two positions, and, with the aid of the adjustable part, regulating a flow rate of the airflow in the space.

By "take-up zone" is meant a region in which the granular material meets and is taken up by an airflow. The take-up zone is thus the space which is present under the roof and can also be defined by that part of a base which is located under the roof.

The side walls and the roof can constitute separate parts. For example, the roof can be downwardly concave, so that lower rims of the roof form the side walls.

As a result of the angle of rest which is created when the material falls into the take-up zone, the space defined by the roof, the side walls and the material will become somewhat larger than the space which would be defined by just the roof and the side walls.

By utilizing an adjustable part to regulate a flow rate, a simple way of controlling the introduction and transport of granular material into an airflow is provided. Thus the flow rate can be lowered for material which is easily taken up, such as rape and sorghum, and increased for material which is more difficult to take up, such as maize and soya beans.

It will be appreciated that, once granular material has been fed to the take-up zone, the flow area of the take-up zone will be reduced, wherein the flow rate is in practice regulated in a space between the material in the take-up zone and the roof.

The adjustable part can be, for example, rotatable or displaceable relative to the take-up zone.

The side walls, which extend downward from the roof, determine a highest level for the material in the take-up zone. Since material continues to fall into the take-up zone, a material level in the take-up zone will be kept constant.

Since the material flows or falls with the aid of gravity into the take-up zone, a bottom edge of the side wall will form a top edge of a material inlet to the take-up zone, wherein the highest level of the material in the take-up zone is determined by the position of the bottom edge of the side wall and, in practice, by the angle of rest which is formed inside the bottom edge, viewed from the take-up zone.

The method can further comprise, with the aid of the adjustable part, regulating a flow area for the airflow in the space between the roof, the side walls and the material.

The method can further comprise, with the aid of the adjustable part, controlling a flow area for a bypass flow, so that a part of this flow is led past the space between the roof, the side walls and the material. The side walls and the roof can here constitute an integrated part.

By routing a part of the flow past the space, the flow rate in the space can be lowered. By instead shutting off the bypass channel, the flow rate in the space can be increased. The bypass further has the advantage that a high-velocity airflow is produced at the outlet, which can help to lend further propulsion to material taken up by the airflow.

Alternatively, or by way of addition, the method can comprise, with the aid of the adjustable part, controlling a height position of the side walls. By lowering of the side walls toward the bottom, the material level in the take-up zone will drop and thus the flow area will increase, which lowers the flow rate in the space between the roof, side walls and the material.

The method can also comprise providing a feed zone beside the take-up zone, wherein the material is fed to the feed zone with the aid of gravity and is allowed to flow or fall to the take-up zone in a direction transversely to the airflow.

The method can also comprise feeding the material-laden airflow from the outlet to a row unit comprising a material buffer and at least one dispensing device for feeding the material toward ground to which the material is to be dispensed.

The method can further comprise feeding the material-laden airflow to the material buffer until this is full, and halting the feed once a predetermined material level is reached in the material buffer.

The feed can be halted either by utilizing a system in which the airflow is restricted or reduced by the material itself once a predetermined level is reached in the buffer. Alternatively, a valve can regulate the flow on the basis of a signal from a material level sensor.

According to a second aspect, a device for feeding granular material to an airflow in an agricultural implement is provided. The device comprises a roof, which defines the extent of a take-up zone, viewed in a horizontal plane, an outlet, associated with the take-up zone, for material-laden airflow, side walls, arranged on respective sides of the take-up zone, so that the roof and the side walls define a space which is open in the downward direction and toward the outlet, an inlet for material, which is open in a horizontal direction transversely to an airflow direction (F) in the space, and which has a top edge, under which the material can fall into the take-up zone, and a part, adjustable between at least two positions, for regulating the flow rate of the airflow in the take-up zone.

Lower portions of the side walls can constitute said top edge.

In the device, the adjustable part can comprise the roof.

The roof can be displaceable between a first position, in which the take-up zone has a flow area which is at least equally as large as a flow area of the outlet, and a second position, in which the roof is level with the top edge.

The device can further comprise a bypass channel, which connects incoming airflow directly to the air outlet.

The adjustable part can comprise a throttle valve, which is arranged to regulate an airflow in the bypass channel.

Alternatively, or by way of addition, the adjustable part can comprise at least one of the side walls.

The roof, viewed in a cross section perpendicular to the airflow, can have a substantially concave cross section, so that the roof has a lowest portion and a highest portion, wherein the lowest portion defines a highest level of the material and the space extends at least between the highest level and the highest portion of the roof.

A base of the take-up zone can constitute a common base with a feed zone, which is upwardly open toward a material container.

According to a third aspect, an agricultural implement comprising a device as described above is provided.

The agricultural implement can further comprise at least one row unit comprising a material buffer and at least one dispensing device for feeding the material toward ground to which the material is to be dispensed.

Figure 4A:
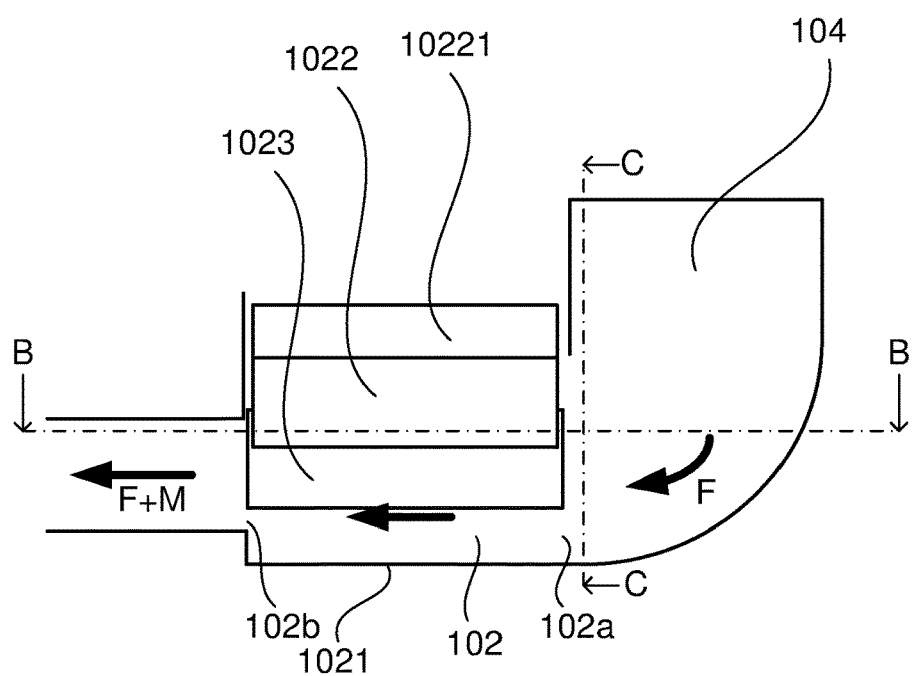
Figure 4B:
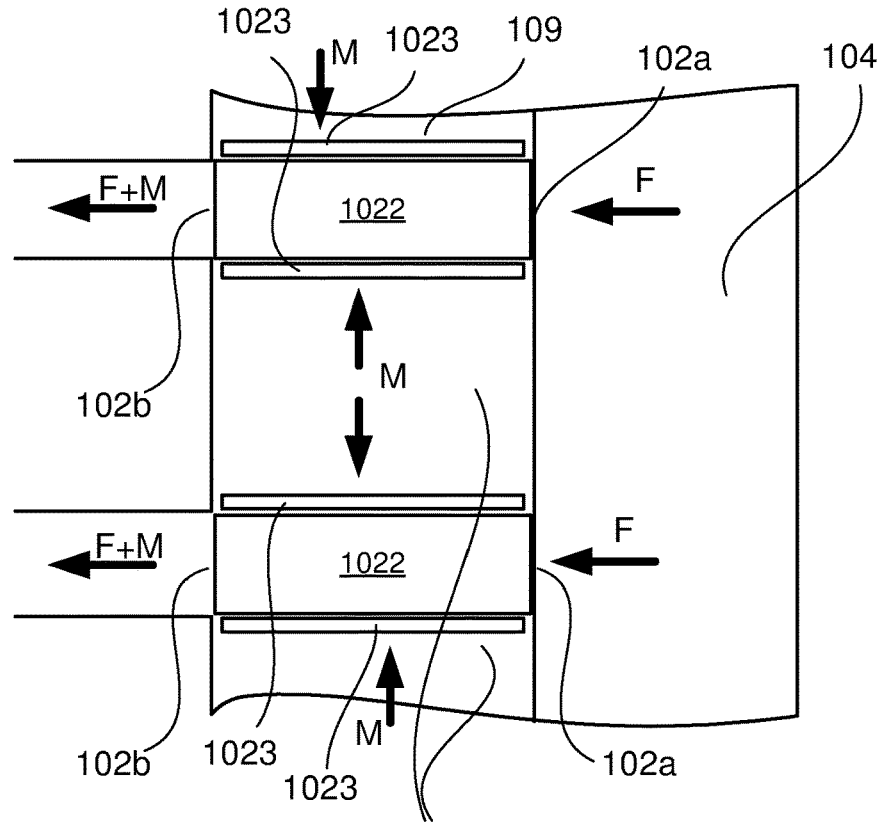
Figure 4C:
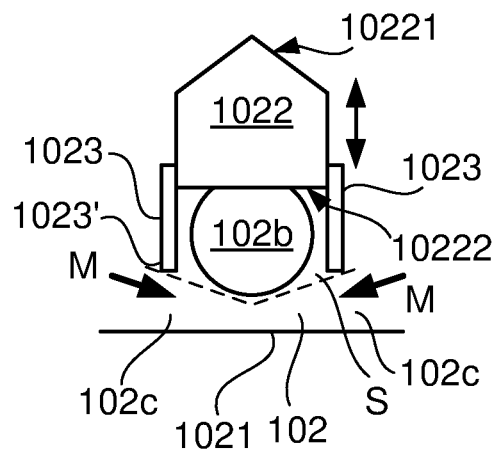
Figure 4D:
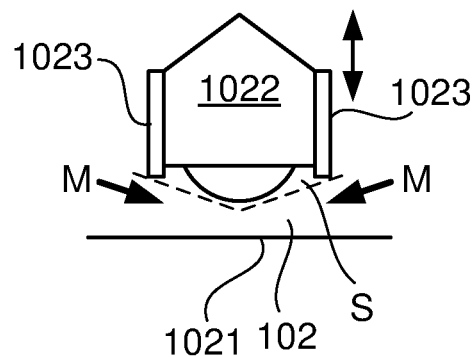
Figure 5A:
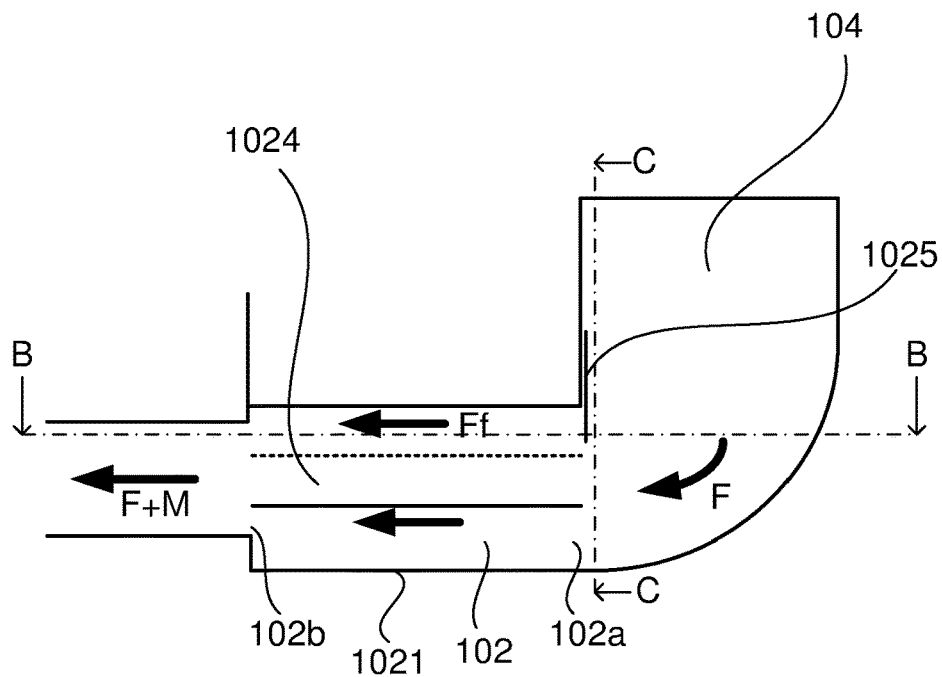
Figure 5B:
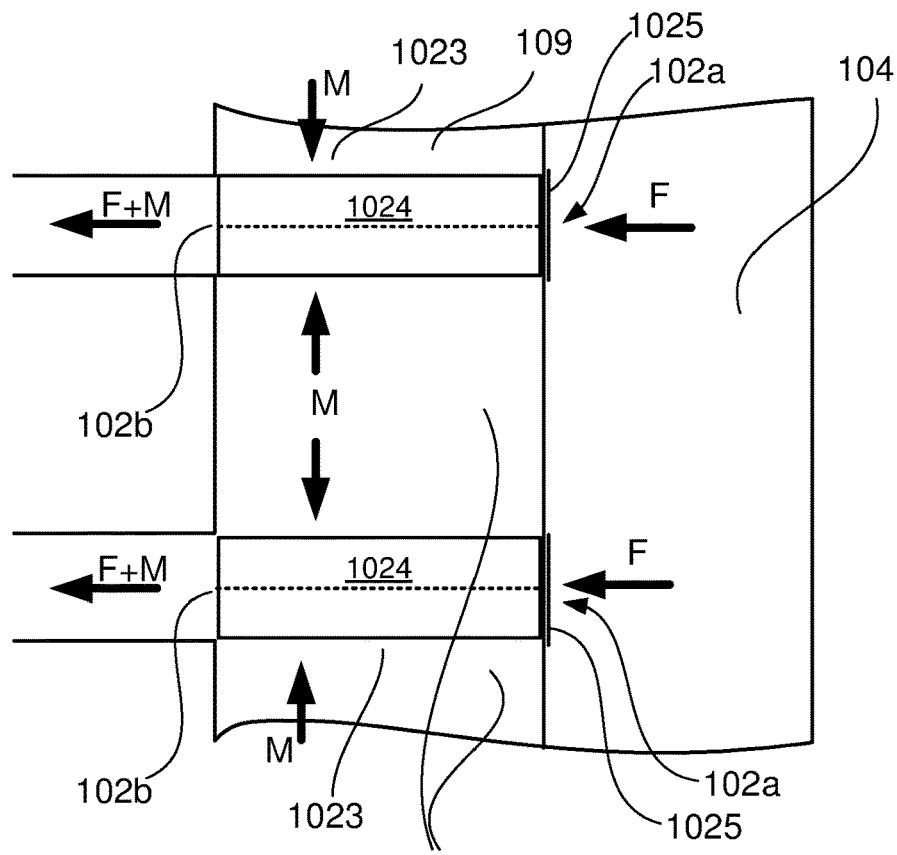
Figure 5C:
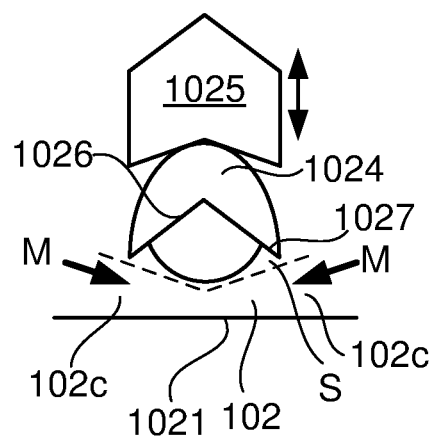
Figure 5D:
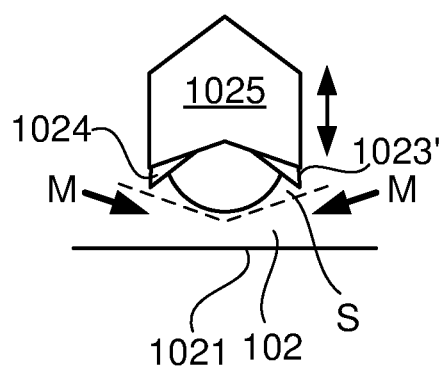

The material buffer can have a material trap, for separating the material from the airflow which transports the material, so that, once a predetermined material level is reached in the material buffer, the material trap is blocked so that the material-laden airflow to the row unit ceases or is reduced.

BRIEF DESCRIPTION OF THE DRAWINGS

FIG. 1 is a schematic perspective view of a device for dispensing granular material.

FIG. 2 is a schematic perspective view of a device for dispensing granular material, viewed from a different perspective than in FIG. 1.

FIG. 3 shows a cross section of a device for dispensing granular material.

FIGS. 4*a*-4*d* show various cross sections of an embodiment of a device for dispensing granular material.

FIGS. 5*a*-5*d* show cross sections of a further embodiment of a device for dispensing granular material.

DETAILED DESCRIPTION

FIG. 1 shows a schematic cross-sectional view of a system 10 for feeding granular material. A central container 101 is connected to a distributing device 100 which has a take-up zone 102 and a material inlet 103. The take-up zone 102 has an air inflow zone 102*a*, which is open toward a feed channel 104, common to at least two take-up zones, for airflow (F), and an outlet 102*b* for material-laden airflow.

From the outlet 102*b*, a channel 106 runs to a row unit 107 comprising a buffer space 1071, a feed limiting device 1072, which is arranged to receive material from the buffer space 1071 and feed this at a predetermined rate to a coulter 1073, with which the material is conveyed down into the earth 0.

The row unit 107 can be, for example, of such type as is shown in WO2013180619A1.

Granular material is filled, for example, into the container 101 by feeding from a magazine or from sacks. Replenishment of granular material can also be made during operation.

An airflow F is produced in conventional manner with the aid of a fan, which can be hydraulically or electrically driven.

Material which is present in the container 101 falls, principally under the influence of gravity, via the material inlet 103 down to the take-up zone 102. The airflow F is fed from the feed channel 104 via the air inflow zone 102*a* to the take-up zone 102, in which the material is taken up into the airflow F and is conveyed by this, in the form of a material-laden airflow F+M, via the outlet 102*b* and the channel 106 to the row unit 107.

FIG. 2 shows a perspective view of the distributing device 100 in FIG. 1, viewed obliquely from above. The airflow into the feed channel 104 is realized through an opening 104*a*, while the feed channel 104 is shut off on the other side by a boundary wall 104*b*. Since the airflow cannot continue in the feed channel 104, the flow F passes through the take-up region 102 and out through a number of outlets 105.

In FIG. 2 can be seen the material inlet 103, which is open upward toward the container 101 (FIG. 1), and twelve outlets 105, which are associated with a respective take-up zone.

FIG. 3 shows a perspective view in cross section of the distributing device 100 in FIG. 2. In FIG. 3 can be seen the material inlet 103, the take-up zone 102, the air feed channel 104 and the outlet 105.

FIGS. 4*a*-4*d* show sectional views of an embodiment of a device for dispensing granular material, in which FIG. 4*a* shows the device viewed from the side, FIG. 4*b* shows the device viewed from above (section B-B in FIG. 4*a*), and FIGS. 4c and 4d show the device viewed from the air inflow zone of the take-up zone 102 (section C-C in FIG. 4a). In FIG. 4b are shown two devices arranged side by side in a common feed space 103.

The feed device in FIGS. 4a-4d comprise a take-up zone 102, which has a base 1021, a roof 1022 and a pair of side walls 1023. The take-up zone extends in a longitudinal direction, substantially straight between the air inflow zone 102a and the air outlet 102b, and thus parallel with the airflow.

The take-up zone has a material inlet 102c, which is open in a horizontal direction, transversely to the longitudinal direction. The material inlet can extend between the base and the lower portion 1023' of the side wall 1023.

The roof 1022 extends along the whole of the take-up zone and is adjustable in height. The roof can have an upward facing roof surface 10221, which, viewed in cross section transversely to the longitudinal direction, is upwardly convex, so that material which ends up on the roof surface slides off this to the side toward the feed zones 109. Preferably, the roof has a cross section with upwardly directed roof ridge, on which no material can accumulate.

The roof can further have a downward facing surface 10222, which, viewed in cross section transversely to the longitudinal direction, is flat or downwardly concave or downwardly convex.

The side walls 1023 extend from the top and downward toward the base 1021, but end at a distance from the base, so that material which is fed from the material inlet 103 to the feed zones 109 can flow from the side in toward the take-up zone 102 (see the arrows M in FIGS. 4c, 4d).

A space S (FIG. 4c) is thus formed above the material, between the side walls 1023 and under the roof 1022, through which space the airflow passes.

Since the roof is movable in the vertical direction, the flow area of the space S can be altered, as is shown in FIGS. 4c and 4d. The roof thus constitutes a controllable part.

When the roof is in its upper position (FIG. 4c), the flow rate will assume its lowest value, given a certain flow and pressure from an air source.

When the roof is in its lower position (FIG. 4d), the flow rate will be higher than in FIG. 4c, which gives the capability to entrain larger or heavier granules.

The roof 1022 can be continuously adjustable, or adjustable in a plurality of steps. For example, the roof can be adjustable between an upper position, in which the flow area of the take-up zone (the space S) is at least equally as large as the flow area of the outlet 102b, and a lower position, in which the flow area of the take-up zone is defined by the space S created as a result of the angle of rest which is formed as a result of the material falling from the side and in toward the center of the take-up zone 102 and the lower surface 10222 of the roof 1022.

In the lower position of the roof, its outermost edges in the lateral direction can therefore be level with lower edges of the side walls 1023, or even somewhat lower.

The base 102 can be substantially flat, viewed both in a direction parallel with the airflow F and perpendicular thereto.

Upstream of the air inflow zone 102a, the base can slope in the direction toward the air inflow zone 102a, so that material which falls down in the material inlet 103 cannot remain lying in the feed channel 104, even if overpressure were to arise at the outlet 102b.

In FIG. 4b, two take-up zones 102 and three feed zones 109 are shown. The feed zones 109 are thus separated by the take-up zones 102. The take-up zones 102 of the two devices can be openly connected to the feed zones, that is to say they can together form a common take-up region without any partition walls between the take-up zones and the feed zones.

Even if no partition walls are present between the take-up zones 102, the base, which constitutes the base 106 for a number of adjacent devices, is configured in a way which means that granular material is effectively conveyed toward a respective take-up zone 102.

For example, the feed zones 109 can have an elevated portion midway between two adjacent take-up zones, wherein the bottom slopes from the elevated portion toward a respective take-up zone 102.

Even though in FIG. 4b only two devices are shown, a system for dispensing granular material in an agricultural implement can consist of two or more such adjacent devices, depending on how many outlets to tubes or pipes are required.

In order to be able to control a plurality of controllable parts, one and the same controls can be coupled to all included controllable parts, which gives a synchronized control mechanism. The controls can be configured for manual activation or connected to an actuator.

A user can, for example, make desired adjustments through the use of operating devices, such as a control stick, control knob or the like, on the agricultural implement, or by operation via a control panel in a traction vehicle.

In FIGS. 5a-5d is shown another embodiment, which in large parts conforms to that which is shown in FIGS. 4a-4d.

In FIGS. 5a-5d, however, no movable roof is present. Instead, a bypass channel 1024 is arranged parallel with and separate from the take-up zone 102, so that a part of the airflow F can flow past the take-up zone in the form of a bypass flow Ff, without coming into contact with the material.

In addition, in FIG. 5a-5d is represented the controllable part of a throttle valve 1025, which adjustably regulates the flow Ff in the bypass channel 1024. The material inlet 102c of the take-up zone is open in a horizontal direction, transversely to the longitudinal direction. The material inlet can extend between the base 106 and an rim 1027 of the wall 1027 of the bypass channel, which rim forms a roof for the take-up zone 102.

The bypass channel can have a bottom wall, which, viewed in cross section transversely to the longitudinal direction, is downwardly concave, so that a space S can be formed under the bottom wall 1026, wherein the space is limited upwardly by the bottom wall and downwardly by the granular material and its angle of dip inward toward the take-up zone 102 from the lower portion 1027 of the bottom wall.

Given the presence of a bypass channel, roof and side walls can be integrated with one another, for example configured in one piece.

The bypass channel can have a top wall, which, viewed in cross section transversely to the longitudinal direction, is upwardly convex, so that material which ends up on the top side thereof slides off this to the side toward the feed zones 109. Preferably, the top side has a cross section with upwardly directed roof ridge, on which no material can accumulate.

Just like the roof 1022 shown in FIGS. 4a-4d, the throttle valve 1025 can be displaceable in order to be able to regulate the ratio between bypass air and air which passes through the take-up zone 102.

In order to be able to regulate a plurality of throttle valves 1025, one and the same controls can be coupled to all included throttle valves, which gives a synchronized control mechanism. The controls can be configured for manual activation or connected to an actuator.

In the central container 101 can be arranged an agitator 1011. The agitator can be a mechanical agitator having, for example, wings or paddles which rotate to prevent the occurrence of material bridges in the container. Alternatively, or by way of addition, an agitator can produce an air stream in the container.

According to a further embodiment, the side walls 1023 can be displaceable in height, so that the volume of the space S can be regulated by altering the material level in the take-up zone.

It is possible to make the roof 1022 and/or the side walls 1023 perform an oscillating or shaking movement, for example, up-down and/or sideways, in order to reduce the risk of formation of material bridges.

It will be appreciated that the bypass channel can have an arbitrary cross section, for example semicircular, rectangular or the like, and, if the bottom side of the roof has too little curvature to form a space S, can be combined with flanges which form side walls.

The invention claimed is:

1. A method for feeding granular material in an agricultural implement, the method comprising:

providing a take-up zone having an extent which, viewed in a horizontal plane, is defined by a roof above the take-up zone;

providing an airflow through the take-up zone in a direction toward an outlet from the take-up zone;

providing side walls extending downward from the roof, such that a space which is open in a downward direction and toward the outlet is formed between the roof and the side walls;

feeding the granular material to the take-up zone such that the granular material falls in a direction transversely to the airflow into the take-up zone and delimiting the space in the downward direction;

providing an adjustable part, the adjustable part being rectilinearly adjustable vertically between at least two positions;

regulating, using the adjustable part, a flow rate of the airflow in the space between the roof, the side walls, and the granular material; and wherein the method further comprises, with the aid of the adjustable part, controlling a flow area for a bypass flow, such that a portion of the airflow is led past the space.

2. The method according to claim 1, further comprising:

providing a feed zone beside the take-up zone, wherein the granular material is fed to the feed zone with the aid of gravity such that the granular material flows to the take-up zone in a direction transversely to the airflow.

3. The method according to claim 1, further comprising: feeding granular material-laden airflow from the outlet to a row unit, the row unit comprising a granular material buffer and at least one dispensing device for feeding the granular material toward ground to which the granular material is to be dispensed.

4. The method according to claim 3, further comprising: feeding the granular material-laden airflow to the granular material buffer until the granular material buffer is full; and halting the feed once a predetermined granular material level is reached in the granular material buffer.

5. A method for feeding granular material in an agricultural implement, the method comprising:

providing a take-up zone having an extent which, viewed in a horizontal plane, is defined by a roof above the take-up zone;

providing an airflow through the take-up zone in a direction toward an outlet from the take-up zone;

providing side walls extending downward from the roof, such that a space, which is open in a downward direction and toward the outlet, is formed between the roof and the side walls;

feeding the granular material to the take-up zone with the aid of gravity, such that the granular material falls in a direction transversely to the airflow into the take-up zone and delimiting the space in the downward direction;

providing an adjustable part which is rectilinearly adjustable vertically between at least two positions;

regulating, using the adjustable part, a flow rate of the airflow in the space between the roof, the side walls and the granular material; and adjusting a vertical position of the roof to regulate a flow area for the airflow in the space.

6. A method for feeding granular material in an agricultural implement, the method comprising:

providing a take-up zone having an extent which, viewed in a horizontal plane, is defined by a roof above the take-up zone;

providing an airflow through the take-up zone in a direction toward an outlet from the take-up zone;

providing side walls extending downward from the roof, such that a space, which is open in a downward direction and toward the outlet, is formed between the roof and the side walls;

feeding the granular material to the take-up zone with the aid of gravity, such that the granular material falls in a direction transversely to the airflow into the take-up zone and delimiting the space in the downward direction;

providing an adjustable part which is rectilinearly adjustable vertically between at least two positions;

regulating, using the adjustable part, a flow rate of the airflow in the space between the roof, the side walls and the granular material;

controlling, using the adjustable part, a height position of the side walls, such that a volume of the space is regulated by altering a granular material level in the take-up zone.

7. A device for feeding granular material to an airflow in an agricultural implement, the device comprising:

a roof, wherein the roof defines an extent of a take-up zone viewed in a horizontal plane;

an outlet associated with the take-up zone, configured for granular material-laden airflow;

side walls, arranged on respective sides of the take-up zone, wherein the roof and the side walls define an open space in a downward direction and toward the outlet;

an inlet for granular material, the inlet being open in a horizontal direction transversely to an airflow direction in the space, and which has a top edge, under which the granular material falls into the take-up zone; and a part, the part being rectilinearly adjustable vertically between at least two positions, wherein the part regulates the flow rate of the airflow in the space between the roof, the side walls and the granular material, wherein the adjustable part comprises the roof.

8. The device according to claim 7, wherein lower portions of the side walls constitute the top edge.

9. The device according to claim 7, wherein the roof is displaceable between a first position and a second position, wherein the take-up zone has a flow area at least equally as large as a flow area of the outlet at the first position, and the roof is level with the top edge at the second position.

10. A device for feeding granular material to an airflow in an agricultural implement, the device comprising:

a roof, wherein the roof is an extent of a take-up zone viewed in a horizontal plane;

an outlet, the outlet being associated with the take-up zone and configured for granular material-laden airflow;

side walls, arranged on respective sides of the take-up zone, wherein the roof and the side walls define an open space in a downward direction and toward the outlet;

an inlet for granular material, the inlet being open in a horizontal direction transversely to an airflow direction in the space, and which has a top edge, under which the granular material falls into the take-up zone; and an adjustable part, rectilinearly adjustable vertically between at least two positions, wherein the adjustable part regulates the flow rate of the airflow in the open space between the roof, the side walls and the granular material; and a bypass channel, that connects incoming airflow directly to the air outlet.

11. The device according to claim 10, wherein the adjustable part comprises a throttle valve, which is arranged to regulate an airflow in the bypass channel.

12. The device according to claim 10, wherein the roof, viewed in a cross section perpendicular to the airflow, has a substantially concave cross section, such that the roof has a lowest portion and a highest portion, wherein the lowest portion is at a highest level of the granular material and the open space extends at least between the highest level and the highest portion of the roof.

13. The device according to claim 10, wherein a base of the take-up zone comprises a common base with a feed zone upwardly open toward a granular material container.

14. A device for feeding granular material to an airflow in an agricultural implement, the device comprising:

a roof, wherein the roof is an extent of a take-up zone viewed in a horizontal plane;

an outlet, the outlet being associated with the take-up zone and configured for granular material-laden airflow;

side walls, arranged on respective sides of the take-up zone, wherein the roof and the side walls define an open space in a downward direction and toward the outlet;

an inlet for granular material, the inlet being open in a horizontal direction transversely to an airflow direction in the space, and which has a top edge, under which the granular material falls into the take-up zone; and an adjustable part, rectilinearly adjustable vertically between at least two positions, wherein the adjustable part regulates the flow rate of the airflow in the open space between the roof, the side walls and the granular material; and wherein the adjustable part comprises at least one of the side walls, and controls a height position such that a volume of the open space is regulated by altering a granular material level in the take-up zone.

15. An agricultural implement comprising a device according to one of claims 7, 10, or 14.

16. The agricultural implement according to claim 15, further comprising at least one row unit comprising a granular material buffer and at least one dispensing device that feeds the granular material toward ground to which the granular material is dispensed.

17. The agricultural implement according to claim 16, wherein the granular material buffer comprises a granular material trap that separates the granular material from the airflow and transports the granular material, wherein the granular material trap is blocked, preventing granular material-laden airflow to the row unit once a predetermined granular material level is reached in the granular material buffer.

* * * * *